United States Patent
Camp et al.

(10) Patent No.: US 10,241,877 B2
(45) Date of Patent: Mar. 26, 2019

(54) DATA STORAGE SYSTEM EMPLOYING A HOT SPARE TO PROACTIVELY STORE ARRAY DATA IN ABSENCE OF A FAILURE OR PRE-FAILURE EVENT

(71) Applicant: INTERNATIONAL BUSINESS MACHINES CORPORATION, Armonk, NY (US)

(72) Inventors: Charles J. Camp, Sugar Land, TX (US); Lev M. Shuhatovich, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/376,248

(22) Filed: Dec. 12, 2016

(65) Prior Publication Data
US 2018/0165169 A1    Jun. 14, 2018

(51) Int. Cl.
*G06F 3/06* (2006.01)
*G06F 11/10* (2006.01)
(Continued)

(52) U.S. Cl.
CPC .......... *G06F 11/2069* (2013.01); *G06F 3/064* (2013.01); *G06F 3/065* (2013.01);
(Continued)

(58) Field of Classification Search
CPC ............. G06F 11/1088; G06F 11/1092; G06F 11/1469
See application file for complete search history.

(56) References Cited

U.S. PATENT DOCUMENTS 6,223,252 B1    4/2001    Bandera et al.
7,698,592 B2    4/2010    Cashman
(Continued)

FOREIGN PATENT DOCUMENTS

CN    103617006    5/2014

OTHER PUBLICATIONS

Savage, Stefan, and John Wilkes, "AFRAID—A Frequently Redundant Array of Independent Disks," originally published in the Proceedings of the USENIX 1996 Annual Technical Conference, Usenix.org., Jan. 1996.
(Continued)

*Primary Examiner* — Jigar P Patel
(74) *Attorney, Agent, or Firm* — Brian F. Russell; Robert Sullivan

(57) ABSTRACT

A data storage system includes a controller, a hot spare storage device and a plurality of primary storage devices. The controller utilizes the hot spare storage device to mirror only a subset of each stripe of logical pages written across the data storage array, where the subset includes a logical page determined by a write input/output operation (IOP) policy. In response to receipt of a write IOP, the controller writes a stripe including a plurality of logical data pages and a logical data protection page across the plurality of primary storage devices and mirrors the logical page determined by the write IOP policy on the hot spare storage device. In response to a failure of a storage device among the plurality of primary storage devices, contents of the failed storage device not already mirrored on the hot spare storage device are rebuilt on the hot spare storage device.

20 Claims, 9 Drawing Sheets

(51) Int. Cl.
  *G06F 11/14* (2006.01)
  *G06F 11/20* (2006.01)
(52) U.S. Cl.
  CPC .......... *G06F 3/0619* (2013.01); *G06F 3/0665* (2013.01); *G06F 3/0688* (2013.01); *G06F 11/1088* (2013.01); *G06F 11/1092* (2013.01); *G06F 11/1469* (2013.01); *G06F 11/2071* (2013.01)

(56) References Cited

U.S. PATENT DOCUMENTS

| | | |
|---|---|---|
| 7,827,351 B2 | 11/2010 | Suetsugu et al. |
| 7,895,393 B2 | 2/2011 | Li |
| 8,082,390 B1 | 12/2011 | Fan et al. |
| 8,386,837 B2 | 2/2013 | Ito et al. |
| 8,601,311 B2 | 12/2013 | Horn |
| 8,762,772 B2 | 6/2014 | Yen et al. |
| 8,775,735 B2 | 7/2014 | Chang et al. |
| 8,812,901 B2 | 8/2014 | Sheffield, Jr. |
| 8,812,902 B2 | 8/2014 | Deepak |
| 9,104,604 B2 | 8/2015 | Cooper et al. |
| 2006/0041793 A1 | 2/2006 | Cherian et al. |
| 2009/0327603 A1 | 12/2009 | McKean et al. |
| 2013/0124798 A1 | 5/2013 | Aszmann et al. |
| 2013/0232292 A1 | 9/2013 | Bandic et al. |
| 2014/0025887 A1 | 1/2014 | Kim et al. |
| 2014/0198629 A1 | 7/2014 | Takagi et al. |
| 2014/0325262 A1 | 10/2014 | Cooper et al. |
| 2015/0012775 A1* | 1/2015 | Cudak .................. G06F 3/0619 714/6.22 |
| 2015/0100822 A1 | 4/2015 | Ohno |
| 2016/0132392 A1* | 5/2016 | Ioannou ................ G06F 3/0619 714/766 |
| 2017/0300393 A1* | 10/2017 | Sreedhar M ........ G06F 11/1658 |

OTHER PUBLICATIONS

Tian et al., "SPA: On-Line Availability Upgrades for Parity-Based RAIDs through Supplementary Parity Augmentations," CSE Technical Reports, TR-UNL-CSE-2009-0006, Department of Computer Science and Engineering, University of Nebraska—Lincoln, Feb. 20, 2009, 16 pages.

Nam et al., "Enhancing Write I/O Performance of Disk Array RM2 Tolerating Double Disk Failures," Proceedings of the International Conference on Parallel Processing (ICPP'02), IEEE Computer Society, 2002.

Anonymous, "Using hot spare disk drives for performance enhancement in a RAID system", IPCOM000019208D, Sep. 2003.

Anonymous, "A method to expand SSD cache using hot spare disks", IPCOM000233970D, Jan. 2014.

Wan et al. (2010). S2-RAID: A New RAID Architecture for Fast Data Recovery. IEEE 26th Symposium on Mass Storage Systems and Technologies (MSST).

Disclosed Anonymously (2014). Method and System for Reducing Read Overhead in a Redundant Array of Inexpensive Disks. IPCOM000237785D, 1-3.

Disclosed Anonymously (2013). Method and System for Augmenting RAID 5 protection with RAID 6 Protection. IPCOM/000243137, 1-4.

* cited by examiner

DATA STORAGE SYSTEM EMPLOYING A HOT SPARE TO PROACTIVELY STORE ARRAY DATA IN ABSENCE OF A FAILURE OR PRE-FAILURE EVENT

BACKGROUND OF THE INVENTION

This disclosure relates to data processing and storage, and more specifically, to a data storage system, such as a flash memory system, that employs a hot spare storage device to proactively store array data in absence of a failure or pre-failure event.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

In data storage systems employing NAND flash memory and/or other storage technologies such as magnetic hard disk drives (HDDs), the availability and/or performance of the data storage system is enhanced by employing some level of data redundancy. For example, data storage systems often employ one or more arrangements (often referred to as "levels") of redundant array of inexpensive (or independent) disks (RAID). Commonly employed RAID levels include RAID 0, which employs data striping across a set of RAID disks (RAID 0 in and of itself does not improve availability but can improve performance); RAID 1, which involves mirroring of RAID disks; RAID 4, which implements block-level striping across RAID disks and a dedicated parity drive; RAID 5, which implements block-level striping across RAID disks and distributed storage of parity information; and RAID 6, which implements block-level striping across RAID disks and distributed storage of two independent sets of parity information. Various RAID levels can also be used in combination to form hybrid RAID arrays; for example, RAID 10, which combines RAID 1 and RAID 0, implements a mirrored set of striped drives. The data redundancy provided by the various standard or hybrid RAID levels allow the data storage system to recover from various modes of failure, thus generally improving data availability and storage system reliability.

In addition to the data redundancy provided by the various levels of RAID, physical device redundancy can also be provided through the provision of one or more spare storage drives. In many cases, the spare storage drives can be so-called "hot" spare drives in that the storage drives are powered on, formatted (if applicable), and ready to be used to rebuild the data storage array in case of the failure of one or more of the storage drives comprising the data storage array. In many cases, hot spare drives do no useful work until a drive failure occurs. After the replacement of the defective drive, the hot spare drive will then usually be employed as the spare and again do no work until and unless another drive fails. Thus, depending on the failure domain(s) to which a hot spare drive is applied, the hot spare drive may never be used, or at most, may be actively used for only a few hours out of the entire life of the data storage array.

BRIEF SUMMARY

In at least one embodiment, a data storage system includes a controller, a hot spare storage device and a plurality of primary storage devices. The controller utilizes the hot spare storage device to mirror only a subset of each stripe of logical pages written across the data storage array, where the subset includes a logical page determined by a write input/output operation (IOP) policy. In response to receipt of a write IOP, the controller writes a stripe including a plurality of logical data pages and a logical data protection page across the plurality of primary storage devices and mirrors the logical page determined by the write IOP policy on the hot spare storage device. In response to a failure of a storage device among the plurality of primary storage devices, contents of the failed storage device not already mirrored on the hot spare storage device are rebuilt on the hot spare storage device.

DETAILED DESCRIPTION

Figure 1A:
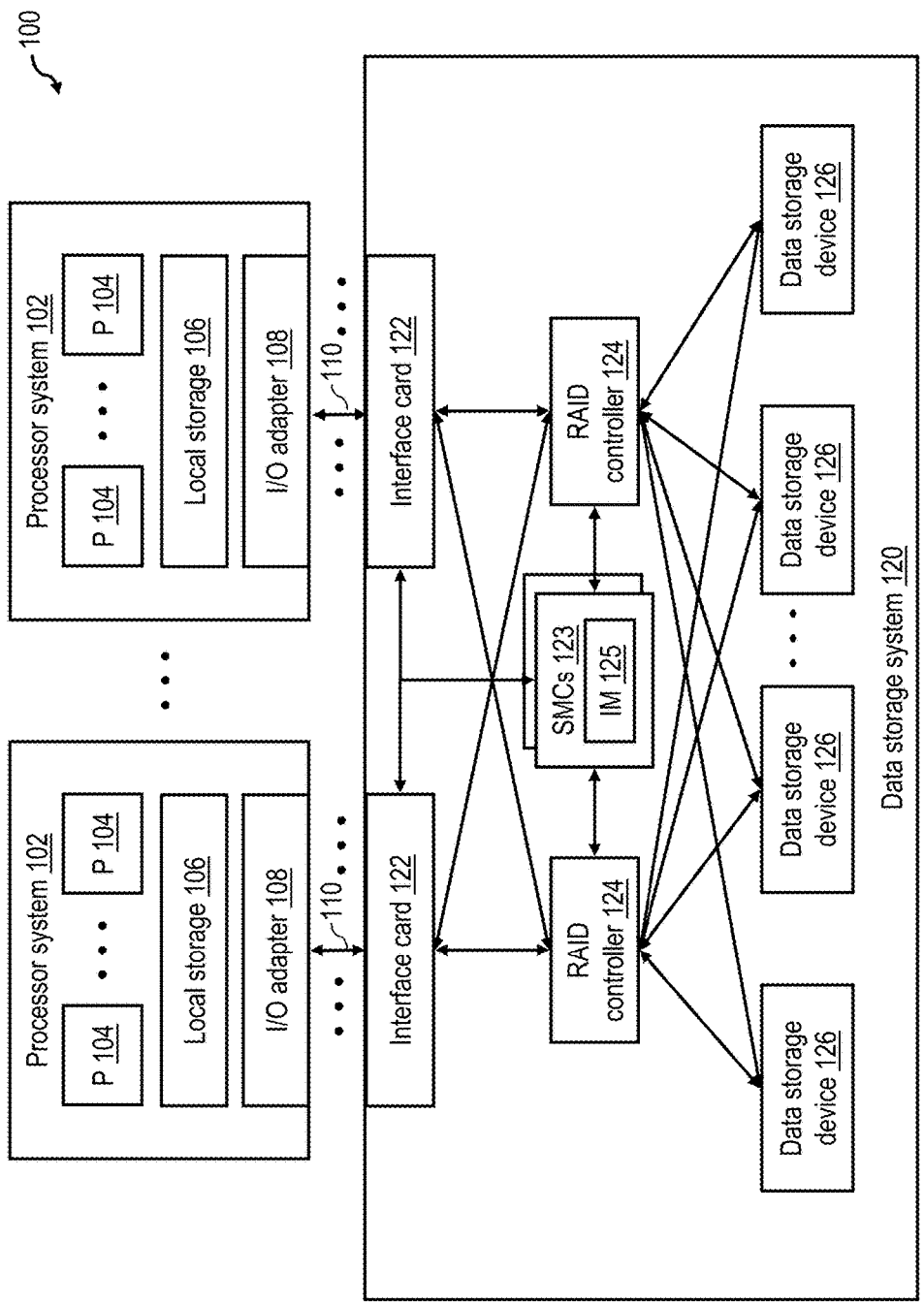
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series of servers available from International Business Machines Corporation), or a mainframe computer system. Processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required, in the illustrated embodiment, data storage system 120 includes multiple interface cards 122 through which data storage system 120 receives and responds to input/output operations (IOP) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple data storage devices 126 including, for example, NAND flash cards and/or HDDs and/or other alternative or additional non-volatile storage devices.

In the depicted embodiment, the operation of data storage system 120 is managed by redundant system management controllers (SMCs) 123, which are coupled to interface cards 122 and RAID controllers 124. In various embodiments, each system management controller 123 can be implemented utilizing hardware or hardware executing firmware and/or software. As described in greater detail below with reference to FIG. 4, each system management controller 123 includes an IOP monitor (IM) 125.

Figure 1B:
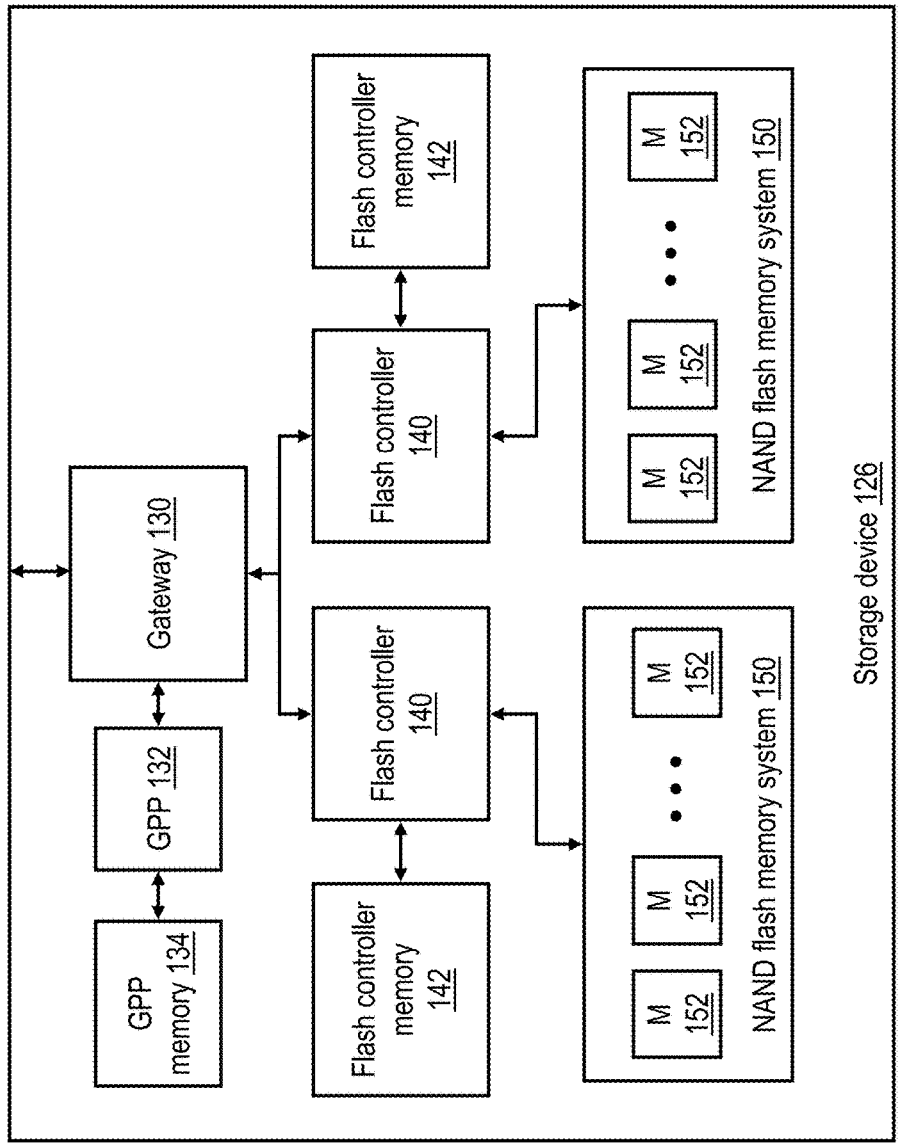
FIG. 1B is a more detailed block diagram of a flash card of the data storage system of FIG. 1A.

FIG. 1B depicts a more detailed block diagram of an exemplary embodiment of a data storage device 126 of data storage system 120 of FIG. 1A in which the storage device is implemented as a flash card. In this embodiment, data storage device 126 includes a gateway 130 that serves as an interface between data storage device 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or Field Programmable Gate Array (FPGA) and/or microprocessor having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Single Level Cell (SLC), Multi-Level Cell (MLC), Three Level Cell (TLC), or Quad Level Cell (QLC) NAND flash memory modules.

Figure 2:
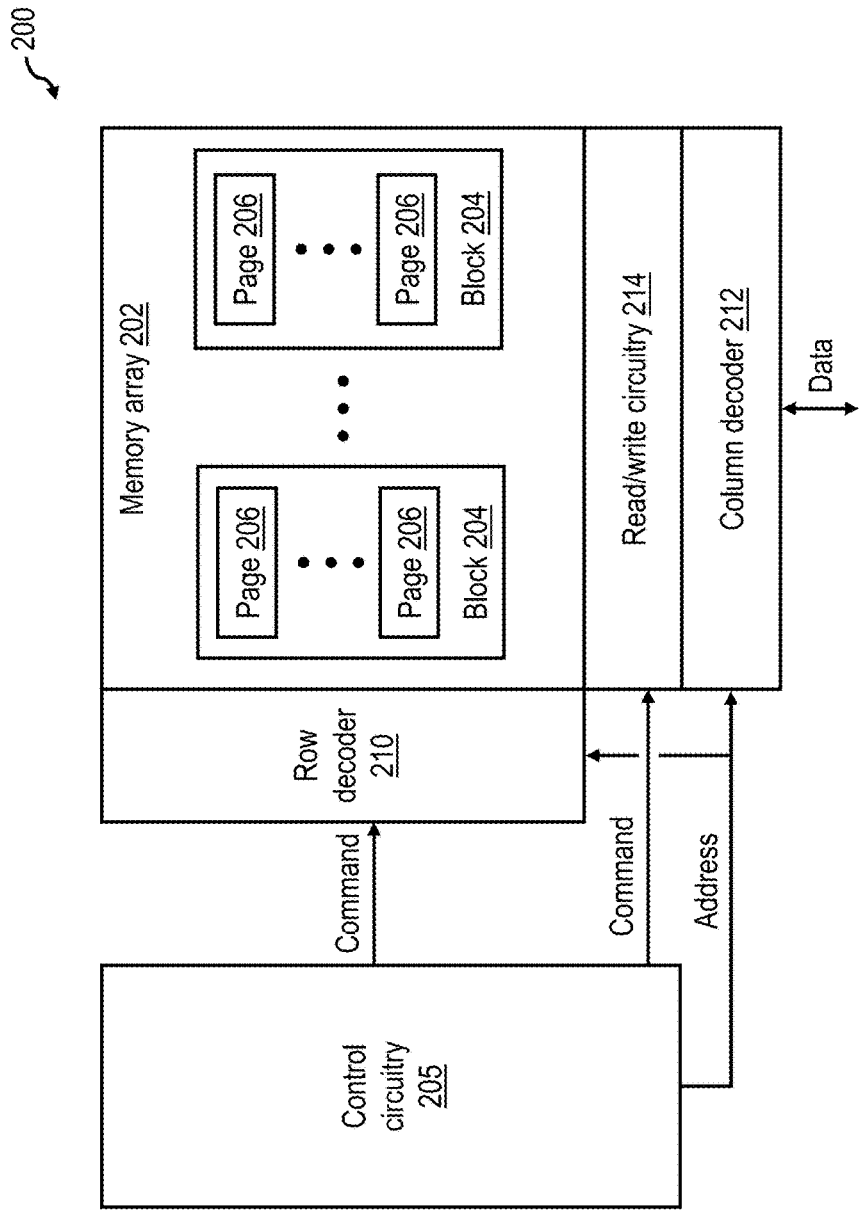
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory is generally constrained by its construction such that the smallest granule of storage that can be erased is a block 204 and the smallest granule of storage that can be accessed by a read or write IOP is fixed at the size of a single physical page 206. It should be appreciated in this regard that the LBAs provided by host devices correspond to logical pages within a logical address space, where each logical page typically has a size of 4 kilobytes. Physical pages 206, in contrast, typically have a larger size, for example, approximately 16 kilobytes (kB), and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices to directly address and/or access the physical memory locations within NAND flash memory systems 150. Instead, data storage system 120 is generally configured to present one or more logical volumes each having a contiguous logical address space to the external devices, thus allowing host devices to read and write data to and from LBAs within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation using a logical-to-physical address translation data structure, such as logical-to-physical translation (LPT) table 300, which can be stored, for example, in the associated flash controller memory 142.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 132 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write IOP received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 310 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read IOPs by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the data of the old block stripe be written to a new block stripe in NAND flash memory system 150. Once all still valid data has been moved from the old block stripe, the old block stripe is passed to dissolve block stripes function 316, which decomposes the old block stripe into its constituent blocks, thus disassociating the blocks. Each of the blocks formerly forming the dissolved block stripe is then erased under the direction of flash controller 140 and/or the control circuitry 205 of the relevant flash memory module 200, and a corresponding program/erase (P/E) cycle count for each erased block is incremented. Based on the health metrics of each erased block (e.g., bit error rate (BER) metrics, uncorrectable errors, P/E cycle count, etc.), each erased block is either retired (i.e., withdrawn from use) by a block retirement function 318 among the flash management functions executed on GPP 132, or alternatively, prepared for reuse by placing the block on the appropriate ready-to-use (RTU) queue 306 in the associated GPP memory 134.

Figure 3:
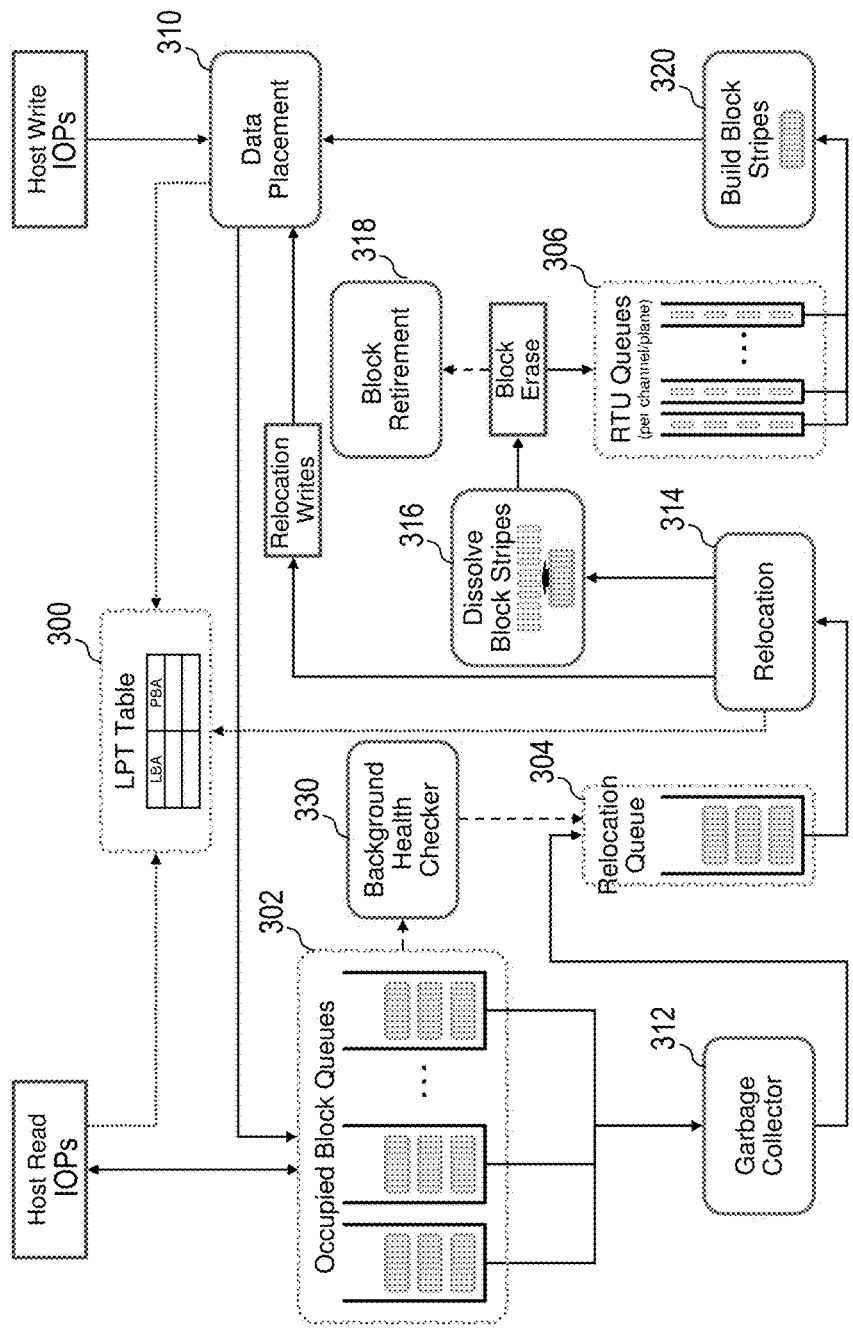
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the demand read and write IOPs of hosts such as processor systems 102, continuously determines one or more metrics of health for blocks belonging to block stripes recorded in occupied block queues 302. Based on the one or more of the health metrics, background health checker 330 places block stripes on relocation queue 304 for handling by relocation function 314. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc.

Figure 4:
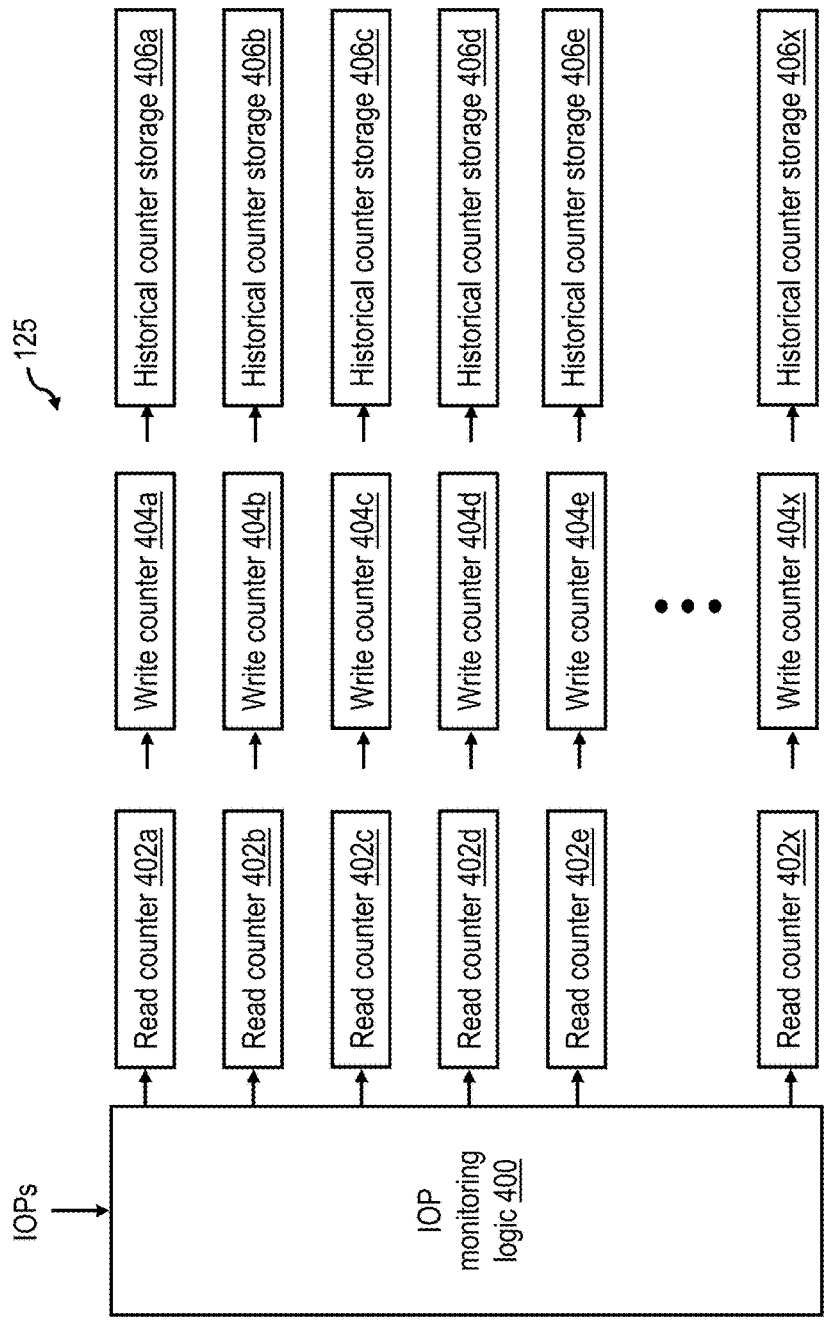
FIG. 4 illustrates a input/output operation (IOP) monitor within a system management controller (SMC) in accordance with one embodiment.

Referring now to FIG. 4, there is depicted a more detailed view of one exemplary embodiment of the IOP monitor (IM) 125 implemented within a system management controller 123. In the illustrated embodiment, IOP monitor 125 includes IOP monitoring logic 400 that detects each read and write IOP received by data storage system 120 and tracks the latencies (response times) of the IOPs. IOP monitor 125 further includes a plurality of read counters 402a-402x and a plurality of write counters 404a-404x, where each pair of counters (e.g., read counter 402a and write counter 404a) is associated with a respective one of a plurality of LBA ranges (or extents). IOP monitoring logic 400 records in each pair of counters 402, 404 the number of read IOPs and the number of write IOPs received by data storage system 120 that target the associated LBA range during the current monitoring interval, which in various implementations may be configurable and may be, for example, 5, 15, 30, or 60 minutes. IOP monitor 125 preferably further includes historical counter storage 406a-406x, in which IOP monitoring logic 400 stores values of read counters 402 and write counters 404 from the prior n (where n is a positive integer) monitoring intervals. As will be appreciated, the number of counters maintained by system management controllers 123 can vary between implementations based on, for example, a desired level of address granularity, the amount of storage available for or allocated to counters 125, and the size of the logical address space supported by data storage system 120. Thus, for example, in one implementation, the size of the LBA ranges may be 1 MB, while in another implementation, the size of the LBA ranges may be 1 GB. By examining the values recorded in read counters 402a-402x, write counters 404a-404x, and historical counter storage 406a-406x, a system management controller 123 can determine which LBA ranges are relatively more frequently accessed (i.e., "hotter") for read accesses and which LBA ranges are relatively more frequently accessed for write accesses. In addition, the system management controller 123 can calculate a variety of additional statistics regarding read and write IOPs, such as mean count values, standard deviation of count values, increases and/or decreases in count values, and recent rates of increase and/or decrease in count values.

Figure 5:
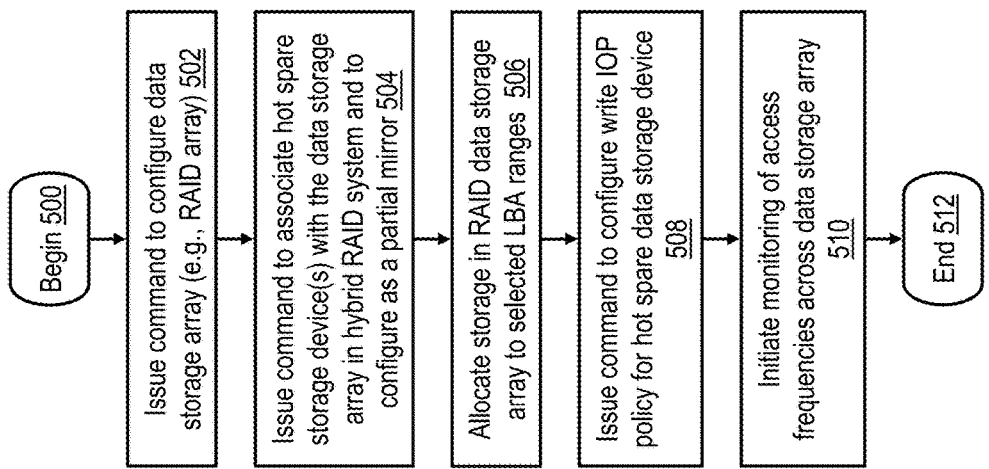
FIG. 5 is a high level logical flowchart of an exemplary process for configuring a data storage array to mirror on a hot spare storage device selected data of the data storage array in accordance with an IOP policy.

With reference now to FIG. 5, there is depicted a high level logical flowchart of an exemplary process for initializing a data storage system to utilize a hot space storage device to store a subset of array data in absence of a failure or pre-failure event in accordance with one embodiment. The process begins at block 500 and the proceeds to block 502, which illustrates system management controller 123 issuing a command to one of RAID controllers 124 to configure multiple of data storage devices 126 into a RAID data storage array. For example, in one embodiment, one or more flash cards can form a logical "disk" or "data storage device," and multiple of such logical data storage devices are configured into a desired level of RAID. Although it is presently preferred for the RAID data storage array to implement a RAID level having higher availability, such as RAID 5 or RAID 6, it should be appreciated that any other RAID level, particularly RAID 0, RAID 3 or RAID 4, could alternatively be employed. The data storage devices selected for inclusion in the RAID data storage array are referred to herein as "primary" data storage devices.

The process proceeds from block 502 to block 504, which illustrates system management controller 123 issuing a command to the RAID controller 124 to associate a spare storage device (e.g., one or more additional flash cards forming a logical "data storage device" 126) with the RAID data storage array configured at block 502 to form a hybrid RAID system. This operation can be performed, for example, when data storage system 120 first begins operation after powering up, in response to replenishment of a spare data storage device after repair/replacement of a defective primary data storage device, or at any time during operation of data storage system 120 at which the spare storage device is present and operable. In response to the command, RAID controller 124 establishes an amount limit of how much data can be stored on the spare storage device (which may simply be the maximum useable capacity of the spare storage device). The remainder of the storage capacity is overprovisioned space used by the flash controller 140 to manage garbage collection and reclamation. This storage capacity is then configured as a mirror for a subset of the data within the RAID data storage array, for example, for one logical block of each data stripe written to the RAID data storage array. In addition, at block 506, system management controller 123 allocates storage on the primary storage devices of the RAID data storage array to selected LBA range(s). The allocation performed at block 506 may be in advance of demand (referred to as "thick provisioning") and/or on-demand (referred to as "thin provisioning"). It should be appreciated that although blocks 502-506 explicitly depict the configuration of only one hybrid RAID system within data storage system 120, in other embodiments system management controller 123 may direct the configuration of multiple independent hybrid RAID systems within data storage system 120.

The process proceeds from block 506 to block 508, which illustrates IOP monitor 125 of system management controller 123 issuing one or more commands to configure a write IOP policy for the hot spare data storage device. The write IOP policy determines the selection of the subset of each data stripe written to the RAID data storage array that will also be written to the hot spare data storage device. For example, in one preferred embodiment, the possible write IOP policies include the following four policies (a non-exhaustive list):

1. Fixed: Logical data pages and data protection (e.g., parity) pages from one particular data storage device are always mirrored on the hot spare data storage device. If the particular data storage device fails, then no reconstruction of the RAID data storage array is required. If instead, another data storage device fails, the reconstruction of the RAID data storage array will take no longer than if no mirroring were performed. The probability of avoiding reconstruction in response to a storage device failure decreases as the number of primary storage devices increases.

2. Proportional: In a RAID data storage array of N primary devices, approximately one Nth of the data written to each of the N devices is mirrored on the hot spare data storage device. This proportional allocation can be achieved by round robin selection among the N devices or the calculation of a hash or other function of the base logical address of the stripe address in order to determine which page within the stripe is mirrored. Proportional selection ensures that, in case of a failure of a primary data storage device, approximately one Nth of the spare card has already been rebuilt.

3. Health-based: As noted above, background health checkers 330 of flash controllers 140 monitor various health metrics of the underlying flash media. RAID controllers 124 and/or flash controllers 140 can estimate the health of data storage devices 126 based on these health metrics and/or other metrics, such as measured board voltages, measured board temperatures, etc. RAID controllers 124 can then mirror data from the least healthy flash card within each stripe to the hot spare data storage device based on the assumption that the least healthy card is most likely to fail first.

4. Temperature-based: Because hot data is written (and overwritten) frequently, this IOP write policy mirrors the coldest data page in each stripe (e.g., as determined by write counters 404) on the hot spare data storage device. Because the coldest data is the least likely to be overwritten, mirroring the coldest data page in each stripe reduces wear on the hot spare data storage device.

It should be appreciated that in some embodiments, SMC 123 can select the page to be mirrored based on a combination of more than one of these IOP write policies and/or switch between the IOP write policies based on the health of hot spare storage device, workload metrics, and/or other factor(s). It should also be noted that SMC 123 preferably performs the illustrated configuration of the hot spare storage device in the absence of (and prior to) receipt of any indication of a failure or pre-failure event or condition regarding any primary storage device within the RAID storage array.

At block 510, SMC 123 initiates monitoring of read and write IOPs targeting LBAs within the various LBA address ranges supported by data storage system 120 utilizing read counters 402a-402x, write counters 404a-404x, and historical counter storage 406a-406x of IOP monitor 125. In this manner, IOP monitor 125 records what LBA ranges have been frequently accessed and infrequently accessed by read and write IOPs in both the current monitoring interval as well as over prior monitoring intervals. Based on the monitoring performed by IOP monitor 125, system management controller 123 identifies frequently accessed LBA ranges that are read more often than written. In identifying these LBA ranges, system management controller 123 may consider read and write counter values from the current monitoring interval only, read and write counter values from the current monitoring interval and historical counter values, or solely historical counter values. If both counter values from the current monitoring interval and historical counter values are considered, system management controller 123 may weight more recent counter values more heavily in identifying LBA ranges that are read more often than written. Further, system management controller 123 may apply one or more thresholds to identify the LBA ranges. For example, in one embodiment, system management controller 123 may identify an LBA range for which the value of the associated read counter 402 in the current and/or prior monitoring interval(s) is greater than a first heat threshold, the value of the associated write counter 404 in the current and/or prior monitoring interval(s) is less than a second heat threshold, and the aggregate of the values of the read counter 402 and 404 is greater than a third heat threshold. In an alternative embodiment, system management controller 123 may identify an LBA range for which the difference between the values of the associated read counter 402 and write counter 404 in the current and/or prior monitoring interval(s) is greater than a fourth heat threshold. In yet other embodiments, other metrics can be employed to identify LBA ranges of interest.

Following block 510, the initialization process of FIG. 5 ends at block 512. Thereafter, data storage system 120 mirrors selected data to the hot spare data storage device in accordance with the configured IOP write policy as described below with reference to FIG. 6.

Figure 6:
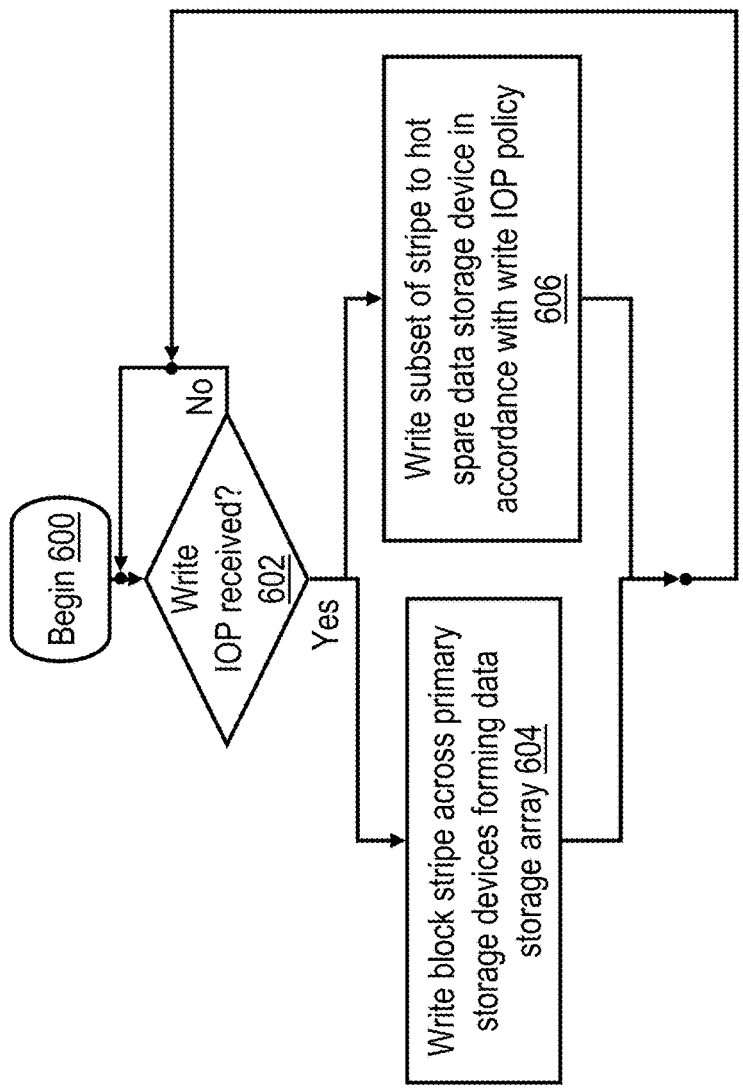
FIG. 6 is a high level logical flowchart of an exemplary process for mirroring on a hot spare storage device selected data of an associated data storage array in accordance with an IOP policy.

Referring now to FIG. 6, there is depicted a high level logical flowchart of an exemplary process for servicing write IOPs in a hybrid RAID storage system including a RAID data storage array and a hot spare storage device in accordance with one embodiment. The process begins at block 600 following the initialization process given in FIG. 5. The process proceeds from block 600 to block 602, which illustrates a RAID controller 124 awaiting receipt of a write IOP from one of interface cards 122. In response to receipt of a write IOP, the process of FIG. 6 proceeds in parallel to blocks 604 and 606. At block 604, RAID controller 124 stripes logical data pages and a data protection (e.g., parity) page across the primary storage devices of the RAID data storage array. In addition, at block 606 RAID controller 124 mirrors a page of the stripe to the hot spare data storage device in accordance with the write IOP policy then configured by the SMC 123. It will be appreciated that because the hot spare data storage device does not remain unused but is instead utilized to mirror a subset of each stripe of logical pages, an unexpected early failure of the hot spare storage device can advantageously be detected in advance of failure of a primary storage device. The process then returns from blocks 604-606 to block 602, which has been described.

Figure 7:
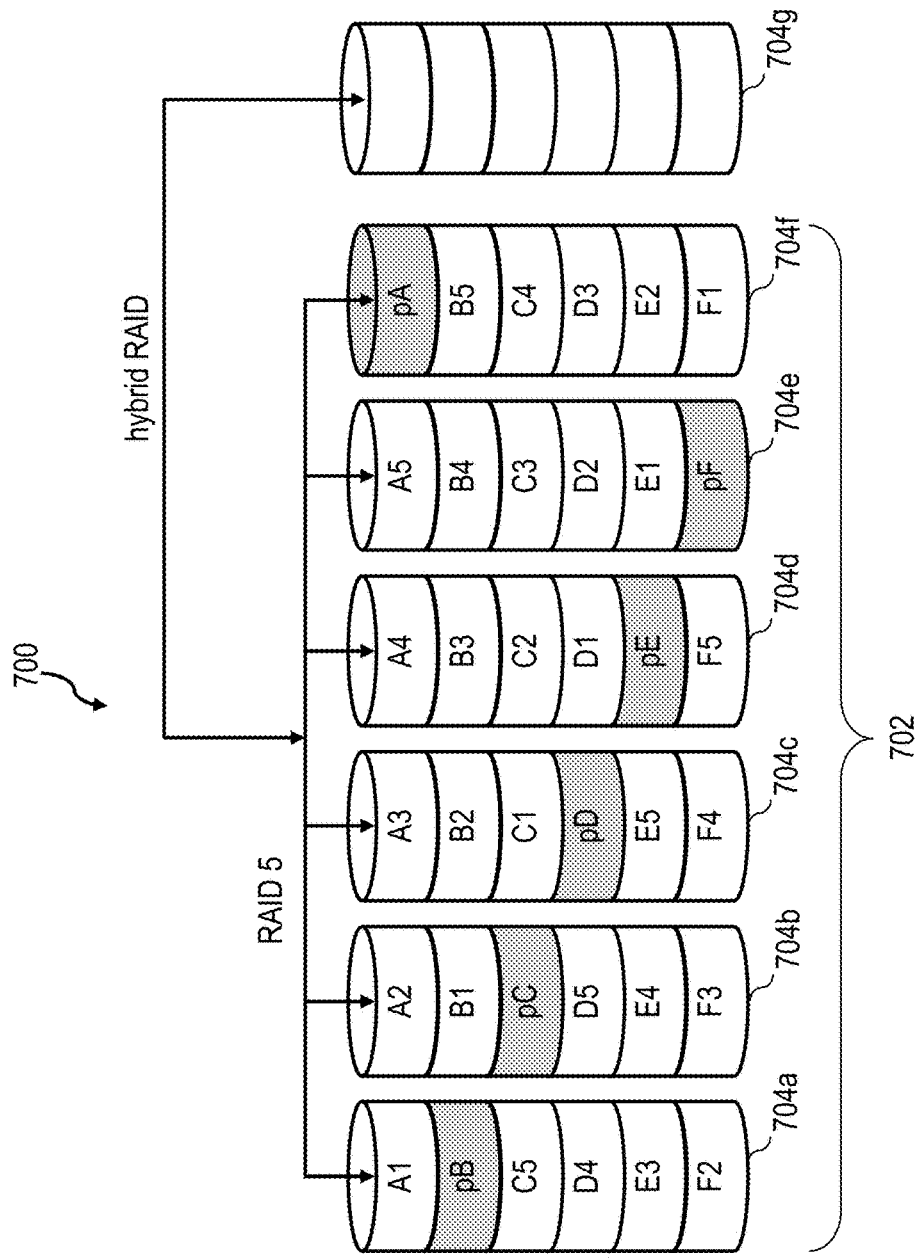
FIG. 7 illustrates an exemplary hybrid RAID system including a RAID 5 data storage array and a hot spare storage device in accordance with one embodiment.

FIG. 7 illustrates an exemplary hybrid RAID system in data storage system 120 following the configuration process illustrated in FIG. 5 and a number of writes to the array in accordance with the process of FIG. 6. In particular, FIG. 7 illustrates a hybrid RAID system 700 including a RAID 5 data storage array 702 and a hot spare storage device 704g associated with RAID 5 storage array 702 in a hybrid RAID arrangement. RAID 5 storage array 702 further includes a plurality of (in this case, six) primary data storage devices 704a-704f. As is known in the art, RAID 5 data storage arrays employ data striping with distributed parity. Accordingly, in this example, data stripes A-F, which each includes five logical pages numbered 1 to 5 (e.g., A1 . . . A5, B1 . . . B5, etc.) and a parity block (e.g., pA, pB, etc.), are striped across primary storage devices 704a-704f, with the parity pages being distributed among the various primary storage devices 704a-704f.

Assuming implementation of the Fixed IOP write policy for hybrid RAID system 700 and selection of assuming primary storage device 704c as the storage device to be mirrored, hot spare storage device 704g would include the following logical pages: A3, B2, C1, pD, E5 and F4. Alternatively, if the Proportional IOP write policy were implemented, hot spare storage device 704g may instead including the following logical pages: A1, B1, C1, D1, E1, and F1. Alternatively, if a Health-based IOP write policy were configured and RAID controller 124 determined that primary storage device 704e was the least healthy primary storage device 704 within hybrid RAID system 700, hot spare storage device 704g would include the following logical pages: A5, B4, C3, D2, E1 and pF. Alternatively, if a Temperature-based write IOP policy were selected, the contents of hot spare storage device 704g could include, for example, logical pages: A4, B5, C1, D4, E5 and F3, assuming these were logical pages corresponding to the coldest write addresses.

Figure 8:
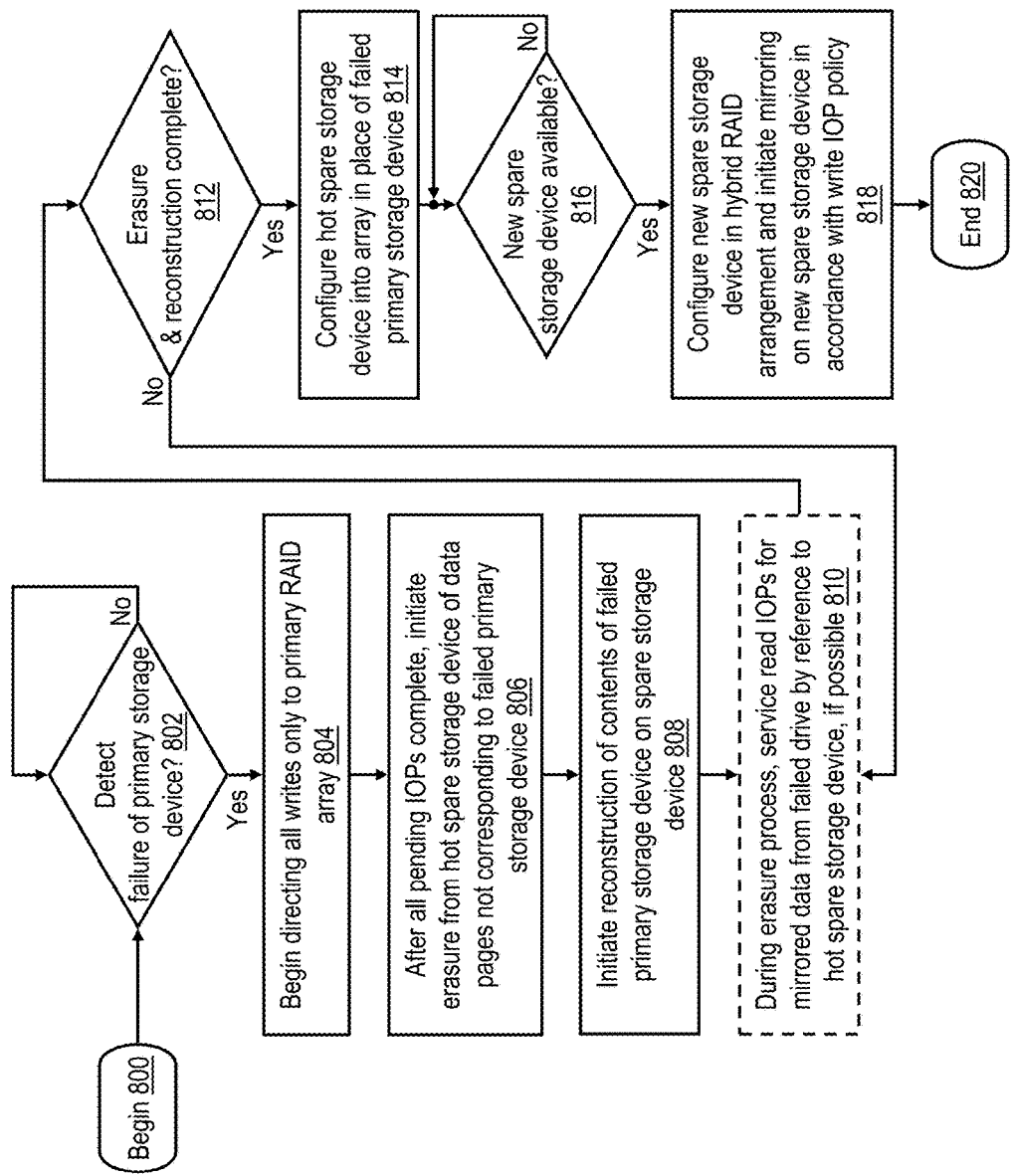
FIG. 8 is a high level logical flowchart of an exemplary process for rebuilding a data storage array utilizing a hot spare storage device in accordance with one embodiment.

Referring now to FIG. 8, there is depicted a high level logical flowchart of an exemplary process for rebuilding a data storage array utilizing a hot spare storage device in accordance with one embodiment. In various embodiments, the process can be directed by a system management controller 123 and/or, as will be hereafter assumed, a RAID controller 124. To promote understanding, the process of FIG. 8 will be described with additional reference to the exemplary hybrid RAID system of FIG. 7.

The process of FIG. 8 begins at block 800 and then proceeds to block 802, which depicts a RAID controller 124 determining whether or not a failure of a primary data storage device (e.g., one of primary data storage devices 704a-704f) within one of its RAID data storage arrays 700 has been detected. If not, the process of FIG. 8 continues to iterate at block 802. In response to a determination at block 802 that a failure of a primary data storage device (e.g., one of primary data storage devices 704a-704f) within the RAID data storage array 700 has been detected, the process proceeds to block 804, which illustrates RAID controller 124 beginning to direct all writes to the primary RAID data storage array 702 rather than mirroring selected data pages to hot spare storage device 704g.

After all pending writes to the hot spare storage device 704g quiesce, RAID controller 124 then trims the hot spare storage device 704g by erasing all logical data pages, if any, on the hot spare storage device 704g that mirror data on non-failed primary storage devices 704 (block 806). In an alternative embodiment of block 806, all the logical data pages on the hot spare storage device 704g that mirror data on non-failed primary storage device 704 is instead invalidated by marking the relevant logical-to-physical table entries invalid and then simply relying on the garbage collection process of the flash controllers 140, as described above. In either embodiment, logical data pages mirroring contents of the failed primary storage device 704 are preferably not marked invalid nor erased from the hot spare storage device 704g, as these blocks would otherwise have to be rebuilt from the other data blocks and parity blocks residing on the operative primary storage devices 704.

As illustrated at block 808, RAID controller 124 also initiates reconstruction of the contents of the failed primary storage device 704 within the unused and erased portions of the hot spare storage device 704g, for example, from the logical data pages and parity page(s) of the data stripes residing on the operative primary storage devices 704. As noted above, the mirrored data pages from the failed primary storage device that already reside on the hot spare storage device 704g need not be rebuilt, but may be relocated, as desired, on the hot spare storage device 704g. In this manner, the time required to reconstruct the contents of the failed primary storage device 704 is reduced.

In one embodiment, RAID controller 124 implements a read IOP policy such that, during the reconstruction of the failed primary storage device 704, all read IOPs are handled by reference to the RAID data storage array (i.e., by reconstructing the requested data from non-failed primary storage devices 704). In an alternative embodiment illustrated at optional block 810, during the reconstruction of the failed primary storage device 704, RAID controller 123 may direct that read IOPs targeting mirrored data that has not been erased from the hot spare storage device can still be serviced by accessing the hot spare storage device 704g. Servicing such read IOPs utilizing the hot spare storage device 704g results in greatly improved response times because the target data need not be rebuilt from the operative primary storage devices 704 of the RAID data storage array.

At block 812, RAID controller 124 determines whether or not the erasure of the dataset initiated at block 806 and the reconstruction of the contents of the failed primary storage device 704 that was initiated at block 808 have both completed. If not, the process of FIG. 8 iterates at optional block 810 and block 812. If, however, RAID controller 124 determines at block 812 that both the erasure and reconstruction processes have completed, RAID controller 124 configures the hot spare storage device 704g into the RAID data storage array 702 in place of the failed primary storage device 704 (block 814). In addition, as indicated at blocks 816 and 818, if a new spare storage device 704 become available (e.g., due to installation of additional flash card(s) or conversion of a cold spare to a hot spare), RAID controller 124 configures the new hot spare storage device in a hybrid RAID arrangement with the RAID data storage array 702 and initiates mirroring of selected logical data pages on the new hot spare storage device in accordance with the current write IOP policy, as described above with reference to FIG. 6. Thereafter, the process of FIG. 8 ends at block 820.

While the preferred embodiment described above employs a single hot spare storage device, it should be appreciated that in other embodiments additional hot spare storage devices can be employed. In such alternative embodiments, SMCs 123 can configure different ones of the hot spare storage devices with differing IOP write policies. Further, although the previously described preferred embodiment mirrors only one logical data page per stripe on the hot spare data storage device, in other embodiments, an SMC 123 or RAID controller 124 can configured the RAID data storage array 702 to mirror multiple logical pages per stripe on the hot spare data storage device(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system includes a controller, a hot spare storage device and a plurality of primary storage devices. The controller utilizes the hot spare storage device to mirror only a subset of each stripe of logical pages written across the data storage array, where the subset includes a logical page determined by a write input/output operation (IOP) policy. In response to receipt of a write IOP, the controller writes a stripe including a plurality of logical data pages and a logical data protection page across the plurality of primary storage devices and mirrors the logical page determined by the write IOP policy on the hot spare storage device. In response to a failure of a storage device among the plurality of primary storage devices, contents of the failed storage device not already mirrored on the hot spare storage device are rebuilt on the hot spare storage device.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory signals per se, forms of energy per se, and transmission media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a controller, a hot spare storage device and a plurality of primary storage devices across which a data storage array is striped, the method comprising:
the controller controlling storage of data on the hot spare storage device such that the hot spare storage device mirrors only a subset of each data stripe written across the primary storage devices, wherein the controller is configured by a write input/output operation (IOP) policy to dynamically determine the subset, and wherein the write IOP policy has a first setting that configures the controller to select a coldest subset of each data stripe having the lowest relative write frequency;
in response to receipt of a write IOP of a host while the controller is configured by the first setting of the write IOP policy, the controller:
writing a particular data stripe including a plurality of logical data pages and a logical data protection page across the plurality of primary storage devices;
determining, in accordance with the first setting of the IOP policy, the coldest subset of the particular data stripe; and
mirroring the coldest subset from the particular data stripe onto the hot spare storage device; and
in response to a failure of a failed storage device among the plurality of primary storage devices, rebuilding, on the hot spare storage device, contents of the failed storage device not already mirrored on the hot spare storage device.

2. The method of claim 1, wherein:
the plurality of primary storage devices includes a particular primary storage device;
the write IOP policy has a second setting in which the subset determined by the write IOP policy to be mirrored on the hot spare storage device is that written to the particular primary storage device; and
in response to receipt of a write IOP of a host while the controller is configured by the second setting of the write IOP policy, the controller:
writing a particular data stripe including a plurality of logical data pages and a logical data protection page across the plurality of primary storage devices;
determining, in accordance with the second setting of the write IOP policy, the subset of the particular data stripe written to the particular primary storage device; and
mirroring the determined subset from the particular data stripe onto the hot spare storage device.

3. The method of claim 1, wherein:
the write IOP policy has a second setting in which the subset determined by the write IOP policy to be mirrored on the hot spare storage device is selected to maintain approximately a same amount of data from each of the plurality of primary storage devices on the hot spare storage device; and
in response to receipt of a write IOP of a host while the controller is configured by the second setting of the write IOP policy, the controller:
writing a particular data stripe including a plurality of logical data pages and a logical data protection page across the plurality of primary storage devices;
determining, in accordance with the second setting of the write IOP policy, the subset of the particular data stripe written to be mirrored on the hot spare storage drive; and
mirroring the determined subset from the particular data stripe onto the hot spare storage device.

4. The method of claim 1, wherein:
the write IOP policy has a second setting in which the subset determined by the controller is that stored on a least healthy primary storage device among the plurality of primary storage devices; and
in response to receipt of a write IOP of a host while the controller is configured by the second setting of the write IOP policy, the controller:
writing a particular data stripe including a plurality of logical data pages and a logical data protection page across the plurality of primary storage devices;
determining, in accordance with the second setting of the write IOP policy, the subset of the particular data stripe written to the least healthy primary storage device; and
mirroring the determined subset from the particular data stripe onto the hot spare storage device.

5. The method of claim 1, wherein the rebuilding further comprises:
retaining on the hot spare storage device logical pages mirrored from the failed storage device; and
removing from the hot spare storage device any logical pages mirrored from any primary storage device other than the failed storage device.

6. The method of claim 1, wherein the controlling step includes the controller controlling storage of data as configured by the first setting of the write IOP policy in absence of any indication of a failure or pre-failure event regarding any of the plurality of primary storage devices.

7. The method of claim 3, and further comprising the controller switching between the first setting and the second setting of the write IOP policy based on at least one of a set including a health of the hot spare storage device and a workload metric.

8. The method of claim 4, and further comprising the controller switching between the first setting and the second setting of the write IOP policy based on at least one of a set including a health of the hot spare storage device and a workload metric.

9. The method of claim 1, and further comprising:
the controller determining the coldest subset based on a weighted combination of write accesses in both first and second monitoring intervals that gives greater weight to accesses in the first monitoring interval.

10. A data storage system, comprising:
a controller configured to be coupled to a hot spare storage device and to a plurality of primary storage devices across which a data storage array is striped, wherein the controller is configured to perform:
the controller controlling data storage on the hot spare storage device such that the hot spare storage device mirrors only a subset of each stripe of logical pages written across the data storage array, wherein the controller is configured by a write input/output operation (IOP) policy to dynamically determine the subset, and wherein the write IOP policy has a first setting that configures the controller to select a coldest subset of each data stripe having the lowest relative write frequency;
in response to receipt of a write IOP of a host while the controller is configured by the first setting of the write IOP policy, the controller:
writing a particular data stripe including a plurality of logical data pages and a logical data protection page across the plurality of primary storage devices;
determining, in accordance with the first setting of the IOP policy, the coldest subset of the particular data stripe; and
mirroring the coldest subset logical page from the particular data stripe determined by the write IOP policy on the hot spare storage device; and
in response to a failure of a failed storage device among the plurality of primary storage devices, rebuilding, on the hot spare storage device, contents of the failed storage device not already mirrored on the hot spare storage device.

11. The data storage system of claim 10, wherein:
the plurality of primary storage devices includes a particular primary storage device;
the write IOP policy has a second setting in which the subset determined by the write IOP policy to be mirrored on the hot spare storage device is that written to the particular primary storage device; and
the controller is configured by the second setting of the write IOP policy to perform:
in response to receipt of a write IOP of a host:
writing a particular data stripe including a plurality of logical data pages and a logical data protection page across the plurality of primary storage devices;
determining, in accordance with the second setting of the write IOP policy, the subset of the particular data stripe written to the particular primary storage device; and
mirroring the determined subset from the particular data stripe onto the hot spare storage device.

12. The data storage system of claim 10, wherein:
the write IOP policy has a second setting in which the subset determined by the write IOP policy to be mirrored on the hot spare storage device is selected to maintain approximately a same amount of data from each of the plurality of primary storage devices on the hot spare storage device;
the controller is configured by the second setting of the write IOP policy to perform:
in response to receipt of a write IOP of a host:
writing a particular data stripe including a plurality of logical data pages and a logical data protection page across the plurality of primary storage devices;
determining, in accordance with the second setting of the write IOP policy, the subset of the particular data stripe; and
mirroring the determined subset from the particular data stripe onto the hot spare storage device.

13. The data storage system of claim 10, wherein:
the write IOP policy has a second setting in which the subset determined by the controller is that stored on a least healthy primary storage device among the plurality of primary storage devices; and
the controller is configured by the second setting of the write IOP policy to perform:
in response to receipt of a write IOP of a host:
writing a particular data stripe including a plurality of logical data pages and a logical data protection page across the plurality of primary storage devices;
determining, in accordance with the second setting of the IOP policy, the subset of the particular data stripe written to the least healthy primary storage device; and
mirroring the determined subset from the particular data stripe onto the hot spare storage device.

14. The data storage system of claim 10, wherein the rebuilding includes:
the controller retaining on the hot spare storage device logical pages mirrored from the failed storage device; and
the controller removing from the hot spare storage device any logical pages mirrored from any primary storage device other than the failed storage device.

15. The data storage system of claim 10, and further comprising the hot spare storage device and the plurality of primary storage devices.

16. A program product, comprising:
a storage device; and
program code stored in the storage device, wherein the program code, when executed by a controller configured to be coupled to a hot spare storage device and to a plurality of primary storage devices across which a data storage array is striped, causes the controller to perform:
controlling data storage on the hot spare storage device such that the hot spare storage device mirrors only a subset of each stripe of logical pages written across the data storage array, wherein the controller is configured by a write input/output operation (IOP) policy to dynamically determine the subset, and wherein the write IOP policy has a first setting that configures the controller to select a coldest subset of each data stripe having the lowest relative write frequency;

in response to receipt of a write IOP of a host while the controller is configured by the first setting of the write IOP policy, the controller:
   writing a particular data stripe including a plurality of logical data pages and a logical data protection page across the plurality of primary storage devices;
   determining, in accordance with the first setting of the IOP policy, the coldest subset of the particular data stripe; and
   mirroring the coldest subset from the particular data stripe on the hot spare storage device; and in response to a failure of a failed storage device among the plurality of primary storage devices, rebuilding, on the hot spare storage device, contents of the failed storage device not already mirrored on the hot spare storage device.

17. The program product of claim 16, wherein:
the plurality of primary storage devices includes a particular primary storage device;
the write IOP policy has a second setting in which the subset determined by the write IOP policy to be mirrored on the hot spare storage device is that written to the particular primary storage device; and
the program code further causes the controller, when configured by the second setting of the write IOP policy, to perform:
   in response to receipt of a write IOP of a host:
      writing a particular data stripe including a plurality of logical data pages and a logical data protection page across the plurality of primary storage devices;
      determining, in accordance with the second setting of the write IOP policy, the subset of the particular data stripe written to the particular primary storage device; and
      mirroring the determined subset from the particular data stripe onto the hot spare storage device.

18. The program product of claim 16, wherein:
the write IOP policy has a second setting in which the subset determined by the write IOP policy to be mirrored on the hot spare storage device is selected to maintain approximately a same amount of data from each of the plurality of primary storage devices on the hot spare storage device;
the program code further causes the controller, when configured by the second setting of the write IOP policy, to perform:
   in response to receipt of a write IOP of a host:
      writing a particular data stripe including a plurality of logical data pages and a logical data protection page across the plurality of primary storage devices;
      determining, in accordance with the second setting of the write IOP policy, the subset of the particular data stripe; and
      mirroring the determined subset from the particular data stripe onto the hot spare storage device.

19. The program product of claim 16, wherein:
the write IOP policy has a second setting in which the subset determined by the controller is that stored on a least healthy primary storage device among the plurality of primary storage devices; and
the program code further causes the controller, when configured by the second setting of the write IOP policy, to perform:
   in response to receipt of a write IOP of a host:
      writing a particular data stripe including a plurality of logical data pages and a logical data protection page across the plurality of primary storage devices;
      determining, in accordance with the second setting of the IOP policy, the subset of the particular data stripe written to the least healthy primary storage device; and
      mirroring the determined subset from the particular data stripe onto the hot spare storage device.

20. The program product of claim 16, wherein the rebuilding includes:
the controller retaining on the hot spare storage device logical pages mirrored from the failed storage device; and
the controller removing from the hot spare storage device any logical pages mirrored from any primary storage device other than the failed storage device.

* * * * *